United States Patent
Faucheux et al.

(10) Patent No.: US 9,954,235 B2
(45) Date of Patent: Apr. 24, 2018

(54) ANODE CHAMBERS WITH VARIABLE VOLUMES

(71) Applicants: Intelligent Energy Limited, Loughborough (GB); Commissariat à l'energie atomique et aux energies alternatives (CEA), Paris (FR)

(72) Inventors: Vincent Faucheux, Grenoble (FR); Antoine Latour, Grenoble (FR); Jessica Thery, Grenoble (FR); Bruno Valon, Grenoble (FR); Gerard F McLean, West Vancouver (CA)

(73) Assignees: INTELLIGENT ENERGY LIMITED, Loughborough (GB); COMMISSARIAT A L'ENERGIE ET AUX ENERGIES ALTERNATIVES, Paris (FR)

( * ) Notice: Subject to any disclaimer, the term of this patent is extended or adjusted under 35 U.S.C. 154(b) by 504 days.

(21) Appl. No.: 14/579,677

(22) Filed: Dec. 22, 2014

(65) Prior Publication Data
US 2016/0181634 A1    Jun. 23, 2016

(51) Int. Cl.
| | |
|---|---|
| *H01M 8/04089* | (2016.01) |
| *H01M 8/04223* | (2016.01) |
| *H01M 8/04082* | (2016.01) |
| *H01M 8/2484* | (2016.01) |
| *H01M 8/0271* | (2016.01) |

(52) U.S. Cl.
CPC ... *H01M 8/04089* (2013.01); *H01M 8/04197* (2016.02); *H01M 8/04201* (2013.01); *H01M 8/04231* (2013.01); *H01M 8/2484* (2016.02); *H01M 8/0271* (2013.01); *H01M 2250/30* (2013.01); *Y02B 90/18* (2013.01)

(58) Field of Classification Search
CPC .................................................. H01M 8/04197
See application file for complete search history.

(56) References Cited

U.S. PATENT DOCUMENTS

| | | |
|---|---|---|
| 8,133,629 B2 | 3/2012 | McLean et al. |
| 2006/0019145 A1* | 1/2006 | Mogi ................ H01M 8/04201 429/456 |
| 2007/0184330 A1 | 8/2007 | McLean et al. |
| 2009/0081493 A1 | 3/2009 | Schrooten et al. |

(Continued)

FOREIGN PATENT DOCUMENTS

| | | |
|---|---|---|
| JP | 2008-108465 A1 | 5/2008 |
| WO | WO-2013/093646 A1 | 6/2013 |

OTHER PUBLICATIONS

"International Application Serial No. PCT/EP2015/080810, International Search Report dated Apr. 14, 2016", 5 pgs.

(Continued)

*Primary Examiner* — Barbara L Gilliam
(74) *Attorney, Agent, or Firm* — Schwegman Lundberg & Woessner, P.A.

(57) ABSTRACT

Described herein are articles, systems, and methods relating to fuel cell systems that include anode chambers with variable volumes. The volume of the anode chamber may be relatively small or essentially zero upon start up to prevent influx of contaminants that would have to be purged from the system. As fuel is directed into the anode chamber, the chamber volume increases to accommodate the flow of fuel.

20 Claims, 7 Drawing Sheets

(56) References Cited

U.S. PATENT DOCUMENTS

| | | | |
|---|---|---|---|
| 2009/0263698 A1* | 10/2009 | Sekino | H01M 8/04201 |
| | | | 429/454 |
| 2010/0151338 A1* | 6/2010 | Sarata | C01B 3/065 |
| | | | 429/416 |
| 2012/0264036 A1 | 10/2012 | Schrooten et al. | |
| 2013/0330643 A1* | 12/2013 | Faucheux | H01M 8/04164 |
| | | | 429/414 |

OTHER PUBLICATIONS

"International Application Serial No. PCT/EP2015/080810, Written Opinion dated Apr. 14, 2016", 6 pgs.

* cited by examiner

ANODE CHAMBERS WITH VARIABLE VOLUMES

FIELD OF THE INVENTION

The subject matter of the present invention relates to fuel cells that include anode chambers with variable volumes.

BACKGROUND

Successive generations of portable electronic devices tend to trend smaller in size while providing increased performance. As electronic components are designed smaller in size and incorporate sophisticated and complex technology, the demands on the associated power supply usually increase. For instance, the power supply may need to occupy less volume or possess a smaller footprint so that the overall device can accommodate the additional technology or decrease in overall size. Further, the additional technology may require that the power supply operate for longer periods of time or that power be delivered at uniform rates for steady performance of the electronic components.

To produce power, a fuel cell system is typically supplied with fuel which is consumed in a fuel cell reaction to produce electrical power. In some fuel cell system architecture, the fuel is directed to a chamber next to the anodes of the fuel cell. Once in this anode chamber, the fuel contacts the anodes and is consumed in the fuel cell reaction to produce electrical power.

However, during the initial stages of a start-up process, the anode chamber of the system may contain air. The air may have entered the anode chamber via permeation through the fuel cell membrane. This air within the anode chamber can interfere with the fuel cell reaction, so typically it must be removed in some way. The oxygen component of the air might be consumed in the fuel cell reaction or side reactions with the fuel, but the nitrogen component of the air must typically be purged from the chamber. To purge the nitrogen, fuel cell systems may use purging protocols at start-up and/or include mechanisms to purge the air from the anode chamber (e.g., a purge valve system).

A need exists for simplified fuel cell systems and methods that do not require special purging protocols or extra mechanisms to purge an anode chamber.

SUMMARY

The present invention includes articles, systems, and methods relating to fuel cell systems that include anode chambers with variable volumes. The volume of the anode chamber may be relatively small or essentially zero upon start up. As fuel is directed into the anode chamber, the chamber volume increases to accommodate the flow of fuel. Since the anode chamber is relatively small at the start-up of the system and is expanded by the flow of fuel, the anode chamber will be substantially devoid of air or other materials, thereby avoiding the need to purge the anode chamber to accommodate the fuel flow. In this way, the present invention provides for simplified fuel cell system architecture because the systems of the present invention do not require the use of any purging components or any purging protocol.

In some embodiments, the present invention includes a fuel cell system. The system may include a fuel cell having a cathode side, a membrane, and an anode side. The system may also include a shell assembly disposed over the anode side and at least partially defining an anode chamber. The anode side of the fuel cell may at least partially define the anode chamber. The system may also include at least one compressible filler occupying a first volume within the anode chamber. The compressible filler is configured to deform to occupy a second volume when a fuel pressure increases within the anode chamber, with the first volume being larger than the second volume. In some embodiments, the first volume is equal or substantially equal to the volume of the anode chamber so that the compressible filler is configured to occupy the entire or substantially the entire anode chamber when the fuel pressure within the anode chamber decreased below a predetermined threshold.

The present invention includes methods of generating electricity using the systems of the present invention. For example, the invention includes a method of generating electricity comprising providing a fuel cell system described herein, directing a fuel through the fuel channel and into the anode chamber, increasing the fuel pressure within the anode chamber until the compressible filler is deformed to occupy the second volume within the anode chamber, and contacting the anode side with the fuel to generate electricity. The method may further include decreasing the flow of fuel into the anode chamber until the compressible member expands to occupy a first volume and/or a first major surface of the compressible filler contacts the anode side of the fuel cell.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
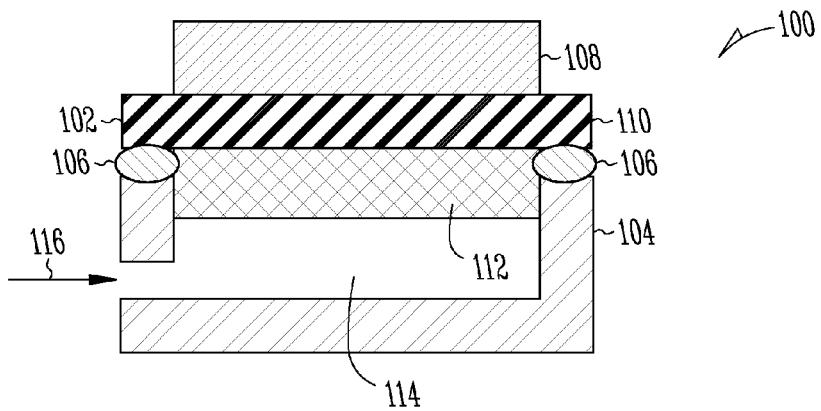
FIG. 1 illustrates a cross-sectional view of a prior art fuel cell system.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different direction in relation to the center of a component and the terms "upper" and "lower" or "inferior" and "superior" may be used to describe two different surfaces of the composite. However, these terms are used merely for ease of description and are not to be understood as fixing the orientation of a fuel cell layer or the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100. In another example, a disclosed range of "1,000 or less" shall also include any range that is less than 1,000, such as 50-100, 25-29, or 200-1,000. In yet another example, a disclosed unbounded range shall include any numerical range greater than the lower bound (e.g., a range of "100 or more" shall include any range that is greater than 100, such as 100-200, 200-500, or 650-10,000).

The present invention includes articles, systems, and methods relating to fuel cell systems that include anode chambers with variable volumes. The volume of the anode chamber may be relatively small or essentially zero upon start up. As fuel is directed into the anode chamber, the chamber volume increases to accommodate the flow of fuel. Since the anode chamber is relatively small at the start-up of the system and is expanded by the flow of fuel, the anode chamber will be substantially devoid of air or other materials, thereby avoiding the need to purge the anode chamber to accommodate the fuel flow. In this way, the present invention provides for simplified fuel cell system architecture because the systems of the present invention do not require the use of any purging components or any purging protocol.

FIG. 1 illustrates prior art fuel cell system 100. Fuel cell system 100 includes fuel cell 102 and shell assembly 104. Fuel cell 102 includes cathode 108, membrane 110, and anode 112. Seals 106 provide a gas-tight seal between shell assembly 104 and the anode side of fuel cell 102, thereby forming anode chamber 114. During operation, a flow 116 of fuel (e.g., a gas or liquid fuel, such as hydrogen) is directed into anode chamber 114 where it comes into contact with anode 112.

At the start-up of system 100, anode chamber 114 typically contains air. Air may enter chamber 114 via leaks within system 100 or by diffusion through membrane 110. The oxygen component of the air may be removed during operation (e.g., via reaction with the fuel), but the nitrogen component of the air must be purged so that fuel flow 116 may fill most or all of anode chamber 114. This purge is typically accomplished with the use of purging systems (e.g., a purge line and/or valves) and/or purging steps during start-up.

Figure 2A:
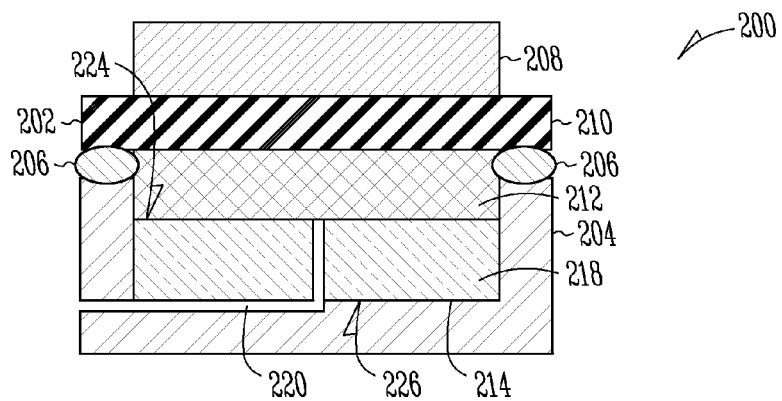
FIGS. 2A and 2B illustrate cross-sectional views of a portion of a fuel cell system of the invention.
Figure 2B:
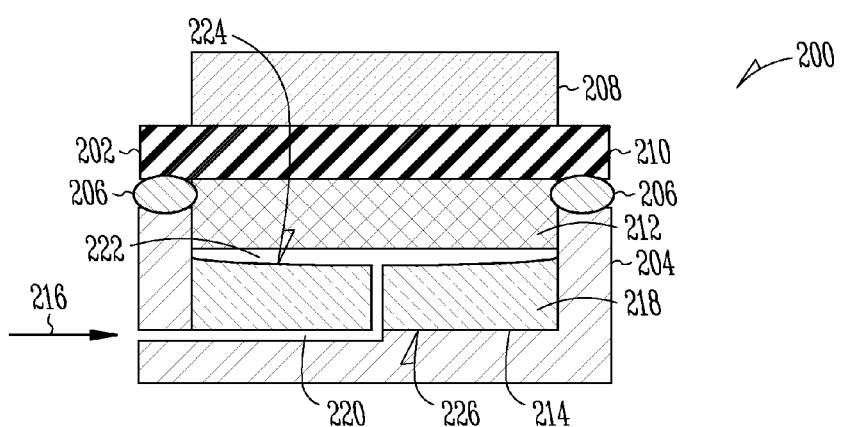

FIGS. 2A and 2B illustrates fuel cell system 200 of the present invention. Fuel cell system 200 includes fuel cell 202 and shell assembly 204. Fuel cell 202 includes cathode 208, membrane 210, and anode 212. Seals 206 provide gas-tight seal between shell assembly 204 and the anode side of fuel cell 202. In some embodiments of the invention, the cathode and anode layers may be formed of a porous material having a network of interconnected pores through which fuels, oxidants, or other gaseous or liquid materials may flow.

As with fuel cell system 100, fuel cell system 200 includes shell assembly 204 attached to the anode side of fuel cell 202 with gas-tight seals 206 thereby defining anode chamber 214. However, unlike fuel cell system 100, fuel cell system 200 includes compressible filler 218 positioned within anode chamber 214. Compressible filler 218 includes a first major surface 224 and a second major surface 226 opposite the first major surface 224. A fuel capillary or fuel channel 220 extends through a portion of shell assembly 204, between second major surface 226 of compressible filler 218 and shell assembly 204, and through compressible filler 218. Fuel channel 220 terminates at first major surface 224. Fuel channel 220 provides for fluid communication between anode chamber 214 and a fuel source (e.g., a hydrogen storage reservoir).

The compressible filler of the systems of the present invention is designed to be resilient such that it expands to occupy a larger portion of the anode chamber when the fuel pressure within the anode chamber decreases. For example, the compressible filler of the present invention may be configured to expand to occupy all or substantially all of the anode chamber if the fuel pressure within the anode chamber decreases below a predetermined level or if the anode chamber becomes essentially devoid of fuel. In this way, the systems of the present invention prevent the anode chamber from filling in air or other contaminants when the systems are shut down or not in use.

FIG. 2A illustrates system 200 when little or no fuel is present within anode chamber 214 (e.g., prior to start-up of the system). In this state, compressible filler 218 occupies all or substantially all of anode chamber 214, with first major surface 224 of compressible filler 218 adjacent to anode 212 and second major surface 226 adjacent to shell assembly 204. Second major surface 226 of compressible filler 218 may be adhered or bonded to shell assembly 204 with adhesives or other securing means, but first major surface 224 of compressible filler 218 is not secured or otherwise bonded to anode 212. Instead, first major surface 224 of compressible filler 218 presses against anode 212 due to the expansive nature of the compressible filler material. Since it occupies all or substantially all of anode chamber 214, compressible filler 218 prevents air or other contaminants that may need to be purged from entering anode chamber 214.

FIG. 2B illustrates system 200 during operation (e.g., shortly after start-up of system 200). During operation, fuel flow 216 is directed into anode chamber 214 via fuel channel 220. Fuel flow 216 passes through shell assembly 204 and compressible filler 218 and exits fuel channel 220 at first major surface 224 and flows between first major surface 224 of compressible filler 218 and anode 212. As the pressure of the fuel rises within anode chamber 214, the increased fuel pressure presses against first major surface 224 and forces it away from anode 212, thereby forming fuel sub-chamber 222. In this way, the increased fuel pressure deforms compressible filler 218 by compressing filler 218 into a smaller volume, thereby forming fuel sub-chamber 222 within anode chamber 214 between anode 212 and first major surface 224, as illustrated in FIG. 2B. When formed, fuel sub-chamber 222 exposes most or all of the surface of anode 212 to the fuel within sub-chamber 222. The compressible filler is configured to deform and compress into a smaller volume when the fuel pressure within the anode chamber reaches about 0.5 to about 60 psig or any fuel pressure subranges that fall within the range of 0.5 to about 60 psig (e.g., about 0.5-1 psig, about 1-5 psig, about 5-10 psig, about 5-25 psig, about 20-30 psig, about 25-50 psig, or about 40-60 psig).

If fuel flow 216 to system 200 is decreased or stopped altogether, the system will consume whatever amount of fuel is remaining within anode chamber 214 and the fuel pressure within anode chamber 214 will decrease. As the fuel pressure within anode chamber 214 decreases, compressible filler 218 expands to occupy a greater volume of anode chamber 214. If the fuel pressure within anode chamber 214 drops below a predetermine threshold or if the anode chamber 214 becomes essentially devoid of fuel, compressible filler 218 will expand until first major surface 224 contacts anode 212 on the anode side of fuel cell 202. In this manner, compressible filler 218 will prevent air or other contaminants from entering anode chamber 214 during shut-down of system 200 or when system 200 is not in operation.

The compressible filler of the present invention may be formed of an elastomeric material that is preferably inert to the fuel material or fuel cell reaction products of system 200 (e.g., rubber, polyurethane, silicone, or the like). The compressible filler may be formed of an electrically insulating material. The compressible filler may be a foam material or other material having a closed network of pores. One or more surfaces of the compressible filler may undergo a surface treatment to impart the compressible filler with a desirable property. For example, the compressible filler may be constructed to include a thin film layer on one or more of the compressible filler surfaces (e.g., the first major surface of the compressible filler that contacts the anode of the fuel cell), such as a thin film that imparts hydrophilic or hydrophobic properties to the surface of the compressible filler which may facilitate the formation of the hydrogen sub-chamber or assists in water management during operation of the fuel cell.

The compressible filler of the present invention may include one or more inflatable components. For example, the compressible filler may include a bladder that can be inflated with a fluid (e.g., a liquid or gaseous material). In some embodiments, the compressible filler may include an inflatable bladder connected to an inflation control system so that the amount of space within the anode chamber occupied by the compressible filler can be actively controlled. By pumping gas or liquid into the bladder, the bladder may be inflated or deflated thereby causing the compressible filler to expand or contact within an anode chamber. When the fuel pressure within the anode chamber is relatively low, actively reducing the volume of the bladder sucks fuel into the anode chamber. Actively increasing the volume of the bladder expels fuel or other chemical species from the anode chamber. In some embodiments, the compressible filler includes a bladder having multiple segmented regions, where one or more of the segmented regions can be inflated or deflated independently from the other segmented regions, thereby providing a means for purging or redistributing gasses and other materials species from or within the anode chamber. In some embodiments, the compressible filler that includes an inflatable component may not be configured to compress or expand in response to a fuel pressure within the anode chamber, but instead by action of an active inflation control system.

The compressible filler of the present invention may include a first major surface (i.e., the surface of the compressible filler that contacts the anode components of the fuel cell when the compressible filler is fully expanded) having embossed relief surfaces and/or other texturing features. For example, the first major surface of a compressible filler may include a network of partial channels embossed therein extending from or about the location where the fuel channel(s) empty into the anode chamber. When the compressible filler is fully expanded and the first major surface is pressed against the anode of the fuel cell, the embossed relief channels can provide for improved egress of fuel from the fuel channel(s) and flow between the first major surface and the anode of the fuel cell. In such embodiments, the embossed pattern may selectively or preferentially direct fuel to various areas of the fuel cell to, for example, ensure uniform or optimized performance across the area of the fuel cell.

The fuel channel may be formed in the system by removing portions of the compressible filler and/or the shell assembly. For example, a laser drill or other mechanical cutting instruments could be used to remove portions of the compressible filler and/or the shell assembly. The fuel channel may have a square, circular, or other geometric shaped cross-sectional profile and may be between 50 microns and 2 millimeters in diameter.

Figure 3A:
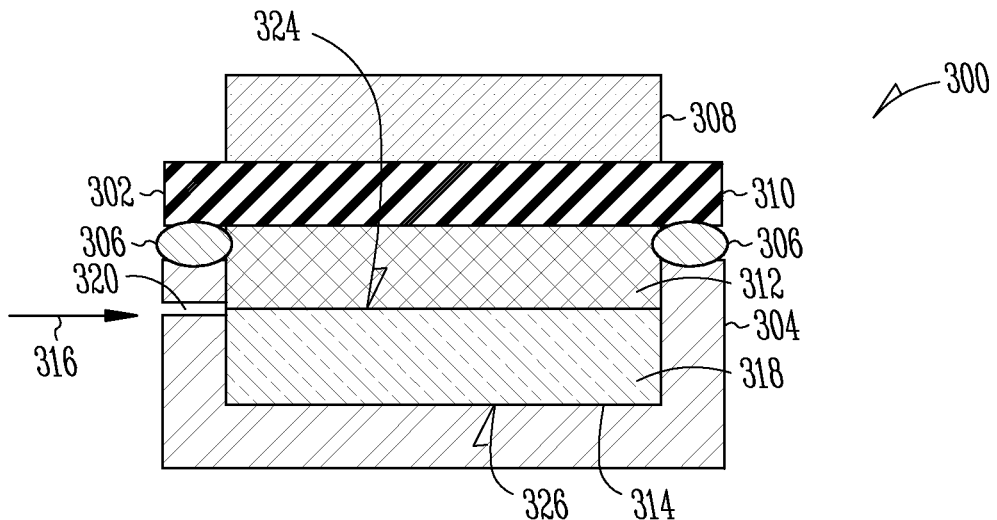
FIGS. 3A and 3B illustrate cross-sectional views of a portion of a fuel cell system of the invention.

While FIGS. 2A and 2B illustrate fuel channel 220 as passing through compressible filler 220, the fuel channel may optionally extend through just the shell assembly without passing through the compressible filler. FIG. 3 illustrates such an embodiment in the form of fuel cell system 300. Like system 200, system 300 includes fuel cell 302 and shell assembly 304. Fuel cell 302 includes cathode 308, membrane 310, and anode 312. Seals 306 provide gas-tight seal between shell assembly 304 and the anode side of fuel cell 302, thereby defining anode chamber 314 in which is positioned compressible filler 318. Compressible filler 318 includes a first major surface 324 and a second major surface 326 opposite the first major surface 324. Unlike system 200, system 300 includes a fuel capillary or fuel channel 320 that extends through a portion of shell assembly 304 but does not extend through compressible filler 318. Instead, fuel channel 320 terminates on the inner surface of shell assembly 304 at a position adjacent to where first major surface 324 contacts anode 312. Fuel channel 320 provides for fluid communication between anode chamber 314 and a fuel source (e.g., a hydrogen storage reservoir). When fuel flow 316 is directed into channel 320, the fuel will flow between first major surface 324 and anode 312. As the fuel pressure within anode chamber 314 increases, the fuel will press against first major surface 324 and force it away from anode 312 to form a fuel sub-chamber.

Figure 3B:
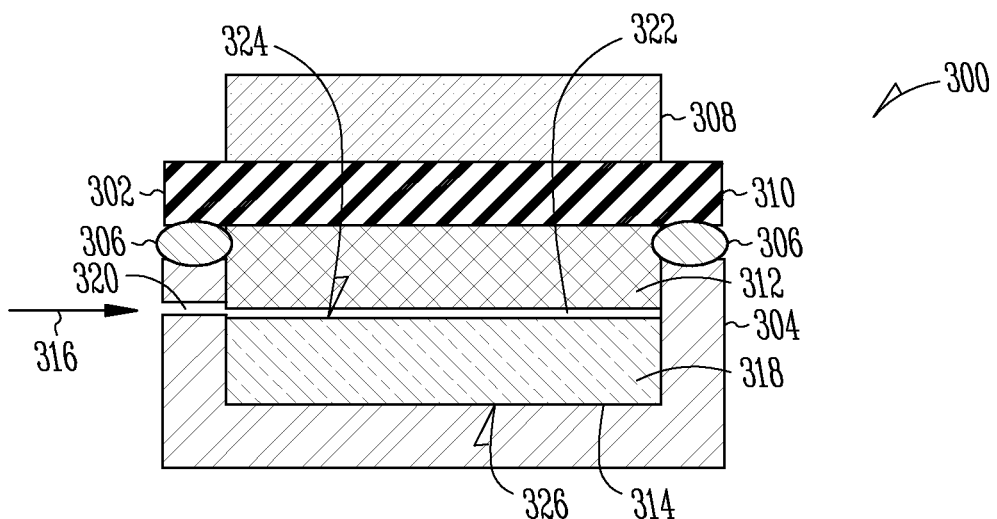

FIG. 3B illustrates system 300 during operation (e.g., shortly after start-up of system 300). During operation, fuel flow 316 is directed into anode chamber 314 via fuel channel 320. Fuel flow 316 passes through shell assembly 304 and exits fuel channel 320 at a position that is just lateral to the plane of contact between first major surface 324 and anode 312. As fuel flow 316 flows between first major surface 324 of compressible filler 318 and anode 312, the pressure of the fuel rises within anode chamber 314 and the increased fuel pressure presses against first major surface 324 and forces it away from anode 312, thereby forming fuel sub-chamber 322. In this way, the increased fuel pressure deforms compressible filler 318 by compressing filler 318 into a smaller volume, thereby forming fuel sub-chamber 322 within anode chamber 314 between anode 312 and first major surface 324, as illustrated in FIG. 3B. When formed, fuel sub-chamber 322 exposes most or all of the surface of anode 312 to the fuel within sub-chamber 322. The compressible filler is configured to deform and compress into a smaller volume when the fuel pressure within the anode chamber reaches about 0.5 to about 60 psig or any fuel pressure sub-ranges that fall within the range of 0.5 to about 60 psig (e.g., about 0.5-1 psig, about 1-5 psig, about 5-10 psig, about 5-25 psig, about 20-30 psig, about 25-50 psig, or about 40-60 psig). In any embodiments described herein, the shell assembly (e.g., shell assembly 204 or 304) may form a fluid manifold which further modulates or controls the flow of fuel into the anode chamber. Furthermore, while only one or a few fuel inlets are illustrated for simplicity, the fuel cell systems of the present invention may include one, two, or several inlets to the anode chambers to facilitate effective distribution of fuel to the anodes of the fuel cells.

If fuel flow 316 to system 300 is decreased or stopped altogether, the system will consume whatever amount of fuel is remaining within anode chamber 314 and the fuel pressure within anode chamber 314 will decrease. As the fuel pressure within anode chamber 314 decreases, compressible filler 318 expands to occupy a greater volume of anode chamber 314. If the fuel pressure within anode chamber 314 drops below a predetermined threshold or if the anode chamber 314 becomes essentially devoid of fuel, compressible filler 318 will expand until first major surface 324 contacts anode 312 on the anode side of fuel cell 302. In this manner, compressible filler 318 will prevent air or other contaminants from entering anode chamber 314 during shut-down of system 300 or when system 300 is not in operation.

Figure 4:
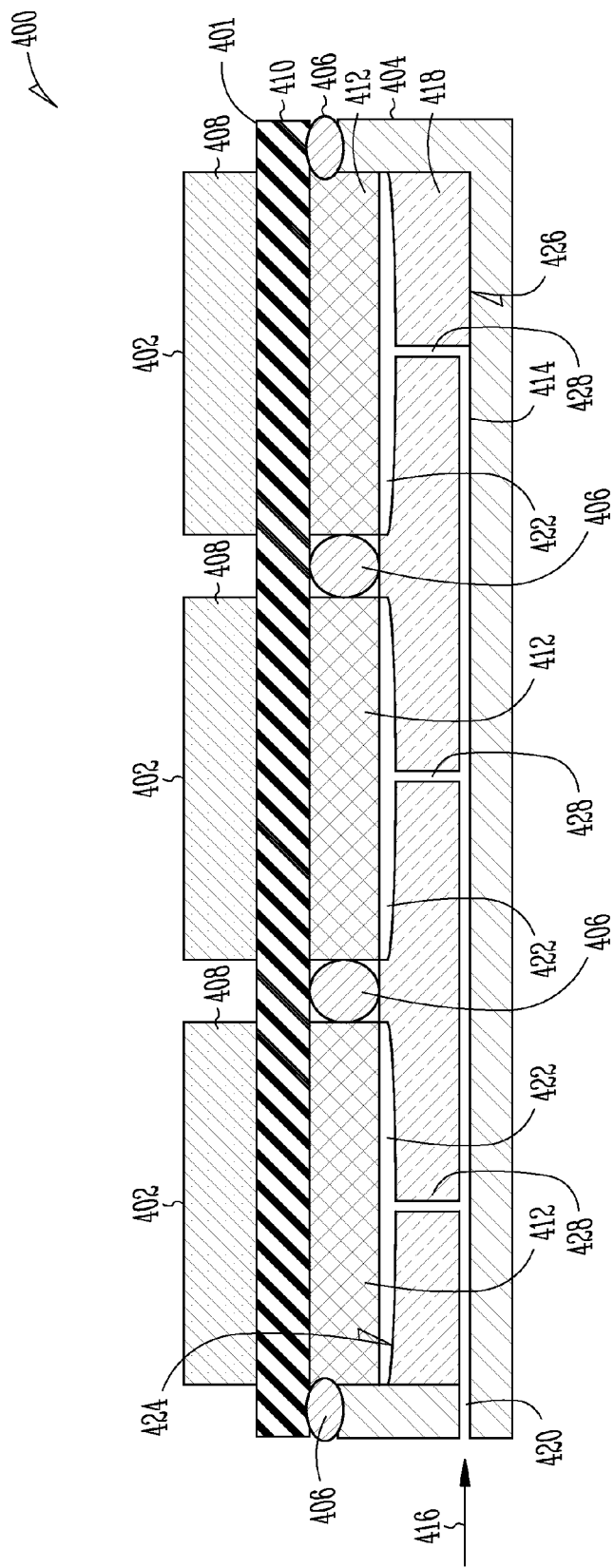
FIG. 4 illustrates a cross-sectional view of a portion of a fuel cell system of the invention.

In some embodiments of the invention, the fuel cell systems include more than one fuel cell and the compressible filler may be configured to provide each fuel cell with its own fuel sub-channel. FIG. 4 illustrates such an embodiment in the form of fuel cell system 400. Fuel cell system 400 includes a planar array 401 of three unit fuel cells 402. Each unit fuel cell 402 of planar array 401 includes a cathode 408 and an anode 412. Each cathode 408 and anode 412 are arranged on opposite sides of membrane 410.

Fuel cell system 400 includes shell assembly 404 and compressible filler 418 positioned within anode chamber 414. Seals 406 provide gas-tight seals between the anode side of planar fuel cell array 401 and portions of shell assembly 404 and first major surface 424 of compressible filler 418. Second major surface 426 of compressible filler 418 is adhered or bonded to shell assembly 404 with adhesives or other securing means. The portions of first major surface 424 underlying anodes 412 between seals 406 are not secured or otherwise bonded to planar fuel cell array 401.

A fuel capillary or fuel channel 420 extends through a portion of shell assembly 404, between second major surface 426 of compressible filler 418 and shell assembly 404, and through a series of sub-channels 428 that each pass through compressible filler 418. Each sub-channel 428 terminates at first major surface 424. It should be understood that for all embodiments described in this invention, any suitable inlet port that allows passage of fuel into the anode chamber(s) may be employed in place of a fuel capillary or fuel channel. For example, where a fluid manifold is employed or other opening in the fluid manifold. Further examples of fluid manifolds that may be employed are included in U.S. patent application Ser. No. 12/238,241, which was filed on 25 Sep. 2008 by Schrooten, et al. and published as U.S. Patent Application Publication 2009/0081493; U.S. patent application Ser. No. 12/053,408 which was filed on 21 Mar. 2008 by McLean, et al. and issued as U.S. Pat. No. 8,133,629; and U.S. patent application Ser. No. 13/361,808 which was filed on 30 Jan. 2012 by Schrooten, et al. and published as U.S. Patent Application Publication 2012/0264036, the disclosers of each of which are herein incorporated by reference in their entirety.

FIG. 4 illustrates system 400 during operation (e.g., after start-up of system 400). During operation, fuel flow 416 is directed into anode chamber 414 via fuel channel 420. Fuel flow 416 passes through shell assembly 404 and then through compressible filler 418 via sub-channels 428. The fuel exits each sub-channel 428 at first major surface 424 and flows between compressible filler 418 and anode 412. As the pressure of the fuel rises within anode chamber 414, the increased fuel pressure deforms compressible filler 418 by compressing filler 418 into a smaller volume, thereby forming a series of fuel sub-chambers 422 within anode chamber 414 between anodes 412 and first major surface 424, as illustrated in FIG. 4. When formed, each fuel sub-chamber 422 exposes most or all of the surface of each anode 412 to the fuel within the respective sub-chamber.

Prior to operation when little or no fuel is present within anode chamber 414 (e.g., prior to start-up of the system), compressible filler 418 occupies all or substantially all of anode chamber 414, with first major surface 424 of compressible filler 418 adjacent to each anode 424 and second major surface 426 adjacent to shell assembly 404. Since it occupies all or substantially all of anode chamber 414, compressible filler 418 prevents air or other contaminants that may need to be purged from entering anode chamber 414.

While system 400 includes three unit fuel cells 402, the fuel cell systems of the invention may include more unit fuel cells. For example, the fuel cell systems of the present invention may include just one unit fuel cell (as illustrated in FIGS. 2A and 2B) or a plurality of fuel cells (e.g., 5, 10, 25, 50, 100, or even thousands of unit fuel cells). The fuel cell system of the present invention may include, for example, 2 to 10,000 unit fuel cells arranged within a planar array. Further, while the unit fuel cells 402 of system 400 illustrated in FIG. 4 share just one membrane 410 that extends along the entire length of planar fuel cell array 401, in some embodiments of the invention the planar array includes a series of discontinuous membranes so that some or all of the unit fuel cells each have their own discreet membrane.

In some embodiments of the invention, the fuel cell that is coupled to the anode chamber may be one of the fuel cells or fuel cell layers described in any of U.S. patent application Ser. No. 12/238,241, which was filed on 25 Sep. 2008 by Schrooten, et al. and published as U.S. Patent Application Publication 2009/0081493; U.S. patent application Ser. No. 13/519,716, which was filed on 28 Jun. 2012 by Schrooten, et al. and published as U.S. Patent Application Publication 2012/0288781; U.S. Pat. No. 8,628,890, which was filed on 28 Jun. 2012 as U.S. patent application Ser. No. 13/535,880 and issued to McLean, et al. on 14 Jan. 2014; U.S. Pat. No. 8,148,436, which was filed as a PCT application on 11 Aug. 2006 and as U.S. patent application Ser. No. 12/063,885 and issued to Capron, et al. on 3 Apr. 2012; or U.S. patent application Ser. No. 12/085,035, which was filed as PCT Application No. PCT/FR2006/002640 on 4 Dec. 2006 and published as U.S. Patent Application Publication 2009/0169945. The entire teachings of each of these publications is incorporated herein by reference. Further, some embodiments of the present invention include an anode chamber coupled to a non-planar fuel cell (e.g., a fuel cell stack, fuel cells that are non-air breathing, or any other fuel cell architecture that includes a fuel plenum).

Figure 7:
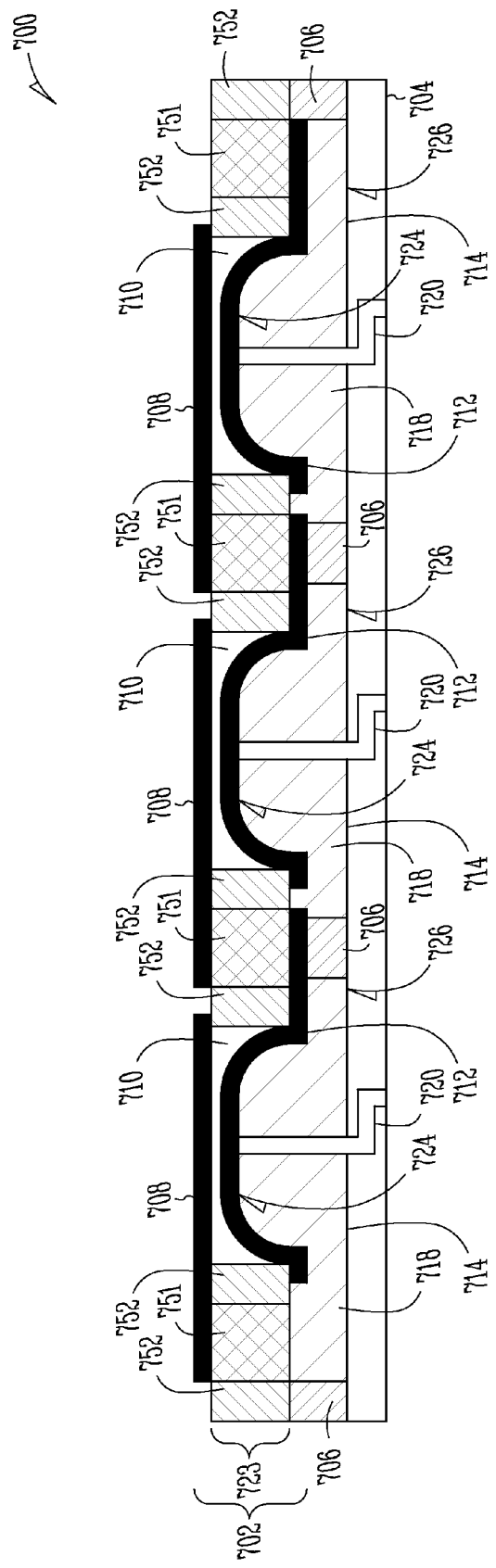
FIG. 7 illustrates a cross-sectional view of a portion of a fuel cell system of the invention.

In some embodiments, the invention includes fuel cells having an asymmetric architecture, such as some of the fuel cells described in US Patent Application Publication 2012/0288781 which is incorporated herein by reference in its entirely. FIG. 7 illustrates such an embodiment in the form of fuel cell system 700. Fuel cell system 700 includes fuel cell layer 702 (which includes a plurality of unit fuel cells) and shell assembly 704. Fuel cell 702 includes a composite layer 723 having ion-conducting components 710 (e.g., membranes) and electron conducting components 751. Optionally, composite layer 723 may also include interface or substrate regions 752 that may include a material that is electrically and/or ionically non-conductive. Electron conducting components 751 and optional interface or substrate regions 752 may form a current collecting system. Ion conducting components 710 are each asymmetric as is composite layer 723. Composite layer 723 of fuel cell 702 also includes cathodes 708 and anodes 712.

Fuel cell system 700 includes shell assembly 704. Seals 706 provide gas-tight seal between shell assembly 704 and the anode side of fuel cell 702. Compressible fillers 718 are positioned within shell assembly 704. Compressible fillers 718 includes a first major surface 724 and a second major surface 726 opposite the first major surface 724. Fuel capillaries or fuel channels 720 extends through portions of shell assembly 704, between the second major surfaces 726 of compressible fillers 718 and shell assembly 704, and through compressible fillers 718. Fuel channels 720 terminates at first major surfaces 724. Fuel channels 720 provides for fluid communication between anode chamber 714 and a fuel source (e.g., a hydrogen storage reservoir).

FIG. 7 illustrates system 700 when little or no fuel is present within anode chamber 714 (e.g., prior to start-up of the system). In this state, compressible fillers 718 occupy all or substantially all of anode chamber 714, with first major surfaces 724 of compressible filler 718 adjacent to anodes 724 and second major surfaces 726 adjacent to shell assembly 704. Second major surfaces 726 of compressible fillers 718 may be adhered or bonded to shell assembly 704 with adhesives or other securing means, but first major surfaces 724 of compressible fillers 718 is not secured or otherwise bonded to anodes 712. Instead, first major surfaces 724 of compressible fillers 718 presses against anodes 712. Since they occupy all or substantially all of anode chamber 714, compressible fillers 718 prevents air or other contaminants that may need to be purged from entering anode chamber 714. When fuel enters anode chamber 714 via channels 720, the increased fuel pressure compresses compressible fillers 718 into a smaller space, thereby forming fuel plenums adjacent to anodes 712.

In FIG. 7, it should be noted that while channels 720 are shown extending through the fluid manifold and the compressible fillers 718 to contact anodes 724, that the channels may or may not be continuous throughout the entire length of the anode chambers 714. For example, shell assembly 704 may have a pattern of channels (e.g. about 0.5 mm to 5 mm in diameter) and may include small apertures (e.g. ~0.1 mm to ~1 mm in diameter) to introduce fuel into the anode chamber 714. These apertures (not shown) may be distributed across the area of the anode chamber 714 along second major surface 726 so as to ensure uniform introduction of fuel across anode chamber 714, or alternately may be located, for example, at the ends of each unit fuel cell along second major surface 726. In such embodiments, channels 720 may either be located in a distributed fashion across the area of the fuel cell layer in locations corresponding to the apertures, or alternately at the ends of each unit fuel cell. In these embodiments, the compressible fillers 718 may be continuous portions of material extending along each unit fuel cell and/or across the area of the fuel cell layer throughout anode chamber 714, with optionally intermittent penetrations to provide channels 720. In still further embodiments, where channels 720 are disposed at one end of the fuel cell layer, compressible fillers 718 may not extend to the end of the anode chamber 714 to provide channels 720.

Figure 5:
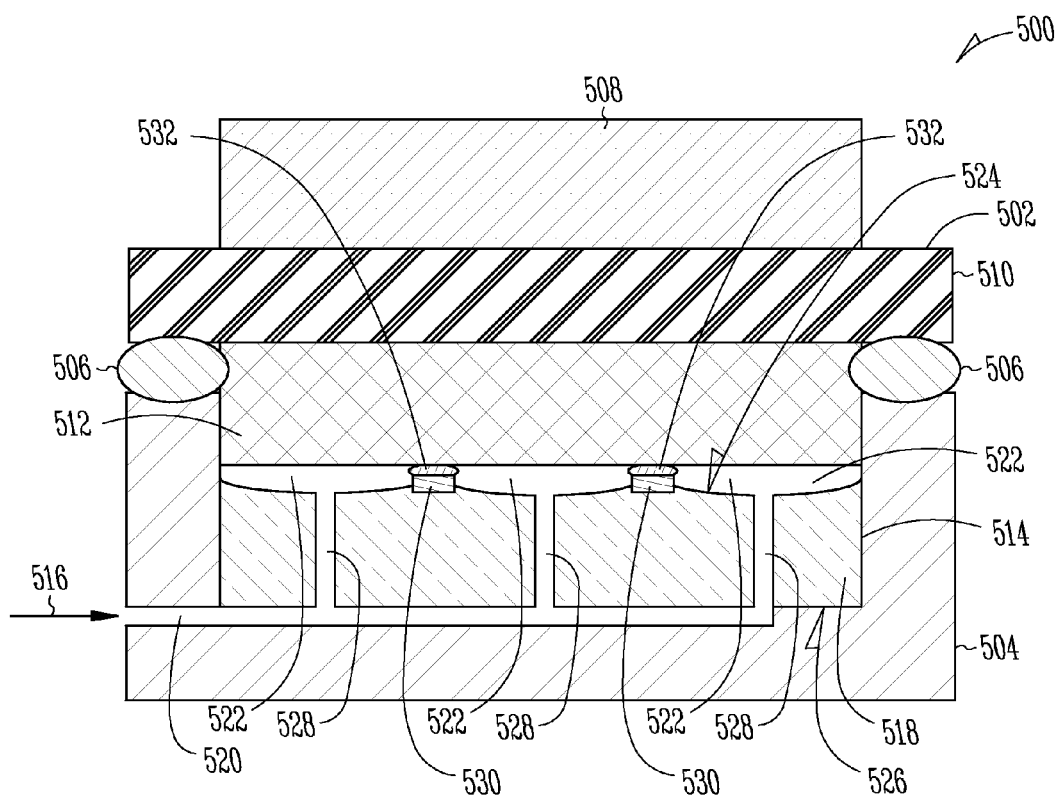
FIG. 5 illustrates a cross-sectional view of a portion of a fuel cell system of the invention.

In yet a further embodiment, the invention includes a compressible filler including a current collecting function. FIG. 5 illustrates such an embodiment in the form of fuel cell system 500. Fuel cell system 500 includes fuel cell 502 and shell assembly 504. Fuel cell 502 includes cathode 508, membrane 510, and anode 512. Seals 506 provide gas-tight seal between shell assembly 504 and the anode side of fuel cell 502.

Fuel cell system 500 includes shell assembly 504 attached to the anode side of fuel cell 502 with gas-tight seals 506 thereby defining anode chamber 514. Fuel cell system 500 includes compressible filler 518 positioned within anode chamber 514. Compressible filler 518 includes a first major surface 524 and a second major surface 526 opposite the first major surface 524. A fuel capillary or fuel channel 520 extends through a portion of shell assembly 504, between second major surface 526 of compressible filler 518 and shell assembly 504, and through compressible filler 518 via a plurality of fuel sub-channels 528. Fuel sub-channels 528 terminate at first major surface 524. Fuel channel 520 provides for fluid communication between anode chamber 514 and a fuel source (e.g., a hydrogen storage reservoir).

One or more current collectors 530 are included on first major surface 524 of compressible filler 518. Current collectors 530 are made of one or more electrically-conductive metal (e.g., Cu, Ni, Au, Pt, Pd, Ru, or Al) and/or electrically-conductive carbon layer. Current collectors 530 are bonded or adhered to anode 512 with electrically-conductive adhesive portions 532.

FIG. 5 illustrates system 500 during operation (e.g., after start-up of system 500). During operation, fuel flow 516 is directed into anode chamber 514 via fuel channel 520. Fuel flow 516 passes through shell assembly 504 and compressible filler 518 and exits fuel sub-channels 528 at first major surface 524 and flows between first major surface 524 of compressible filler 518 and anode 512. As the pressure of the fuel rises within anode chamber 514, the increased fuel pressure presses against first major surface 524 and forces the portions of first major surfaces 524 that are not bonded to anode 512 with adhesive portions 532 away from anode 512, thereby forming fuel sub-chambers 522. In this way, the increased fuel pressure deforms compressible filler 518 by compressing filler 518 into a smaller volume, thereby forming fuel sub-chambers 522 within anode chamber 514 between anode 512 and first major surface 524, as illustrated in FIG. 5. When formed, fuel sub-chambers 522 expose most of the surface of anode 512 to the fuel within sub-chambers 522.

Current collectors 530 are in electrical communication with anode 512 and provide an electric circuit to conduct the electricity produced at anode 512. As system 500 produces electric power, the power is collected from anodes 512 via current collectors 530 and routed to a desired application. In this way, current collectors 530 provide compressible filler 518 with a current-collection function.

Figure 6:
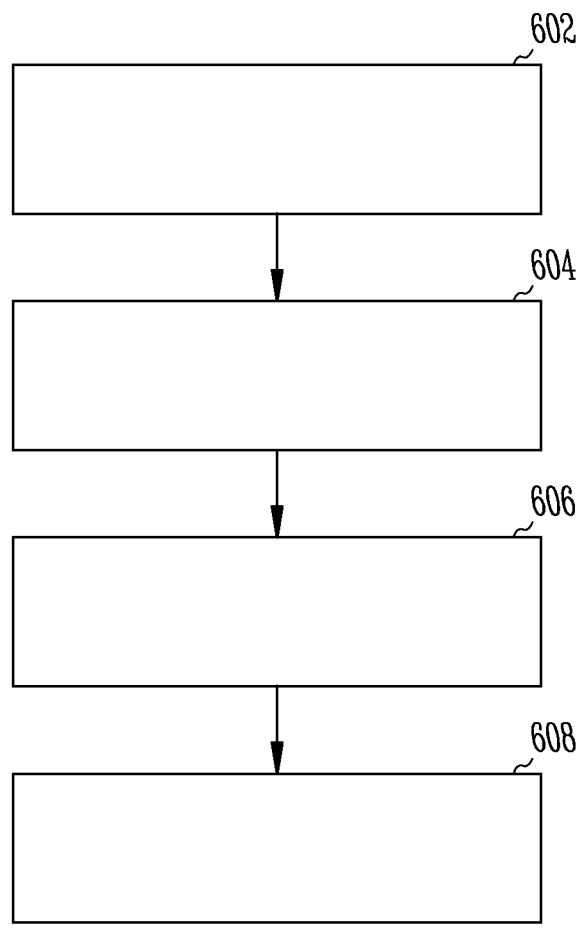
FIG. 6 illustrates a graphic representation of a method of the invention.

The present invention includes methods of generating electricity with the fuel cell systems described herein. FIG. 6 illustrates a graphic representation of such a method. At 602, the method includes providing a fuel cell system that includes a fuel cell, such as one of the systems of present invention described herein. The fuel cell may include a cathode side, a membrane, and an anode side. The system may also include a shell assembly disposed over the anode side of the fuel cell, wherein the shell assembly at least partially defines an anode chamber and the anode side at least partially defines the anode chamber. The system may also include at least one compressible filler occupying a first volume within the anode chamber, wherein the compressible filler is configured to deform to occupy a second volume when a fuel pressure increases within the anode chamber and wherein the first volume is larger than the second volume. The system may also include at least one fuel channel in fluid communication with the anode chamber.

At 604, a fuel is directed through the fuel channel and into the anode chamber. If the anode chamber was substantially devoid of fuel (e.g., at start-up of the system), directing the fuel into the anode chamber will increase the fuel pressure within the anode chamber until the compressible filler is deformed to occupy the second volume within the anode chamber.

At 606, the anode side of the fuel is contacted by the fuel that has been directed into the anode chamber. A fuel cell reaction occurs when the fuel contacts the anode side resulting in the fuel cell generating electricity.

At 608, the fuel pressure within the anode chamber decreases and the compressible filler expands to occupy more space. For example, the flow of fuel into the anode chamber may be throttled down resulting in a drop in fuel pressure within the anode chamber resulting in the compressible filler expanding to occupy more the anode chamber volume. The compressible filler may expand to occupy the entire volume of the anode chamber if the fuel pressure within the anode chamber falls below a predetermined level or if the anode chamber becomes essentially devoid of fuel. In some embodiments, the compressible filler may expand or contract gradually so as to maintain a constant fuel pressure within the anode chamber(s).

In some embodiments, the present invention includes a shell assembly that partitions the anode chamber into two or more fuel flow fields. That is, the shell assembly includes internal dividers that partially define a channel or network of channels through which the fuel may flow once it enters the anode chamber. FIG. 8A illustrates such a shell assembly in the form of fuel cell system 800. Fuel cell system 800 includes fuel cell 802 and shell assembly 804. Fuel cell 802 includes one or more cathodes (not illustrated), membrane 810, and anodes 812.

As with the other fuel cell systems described herein, shell assembly 804 is attached to the anode side of fuel cell 802 and thereby defines anode chamber 814. Compressible filler(s) 818 are positioned within anode chamber 814. Also, as with the other fuel cell systems described herein, the compressible filler 818 is configured to expand or contract to prevent unwanted materials from entering anode chamber 814.

However, unlike the previously described fuel cell systems, shell assembly 804 includes a divider 805 that partitions anode chamber 814 into flow fields 814a and 814b. As fuel enters anode chamber 814, it compresses compressible filler 818 into a smaller volume, pushing compressible filler 818 away from anodes 812 to form a sub-channel between the first major surface of compressible filler 818 and anodes 812. The fuel may propagate along the longitudinal length of flow fields 814a and 814b in a direction that is roughly parallel to line 849 by flowing along the sub-chamber(s). Alternatively, or in addition, if anodes 812 are formed from a material having an interconnected network of pores, the fuel may propagate along the longitudinal length of flow fields 814a and 814b in a direction that is roughly parallel to line 849 by flowing through the length of the porous anodes. In this way, a shell assembly can act as a manifold to help distribute fuel throughout the anode chamber to improve contact with the anode layer(s).

In some embodiments of the invention, the shell assembly has multiple dividers and/or a divider(s) that partition the anode chamber in a network of flow fields. All or some of the flow fields within the anode chamber may be interconnected to form a flow field network that helps distribute fuel over the anodes of the fuel cell. The divider(s) of the shell assembly may be attached to the fuel cell via adhesives or a mechanical attachment means at the point of contact between the dividers and the fuel cell.

In still further embodiments, the filler material may be coupled to the shell assembly, which may be flexible. In such embodiments, it may be the entire shell assembly, instead of just the filler material, that deforms on pressurization of the anode plenum to create space for fuel. For example, the filler material may be integrated into a flexible fluid manifold of a flexible fuel cell layer, such as those described in commonly-owned U.S. Pat. No. 8,790,842 to Schrooten et al, issued 29 Jul. 2014 and titled "Fuel Cell Systems including Space-Saving Fluid Plenum and Related Methods", or into the flexible fluid plenum of a fuel cell structure such as those described in commonly owned U.S. Pat. No. 8,410,747 to McLean et al, issued 2 Apr. 2013 and titled "Flexible Fuel Cell Structures having External Support". Configurations such as these may provide additional flexibility of overall system geometry and volume, with the combined benefits of the filler material within the plenum.

Figure 8:
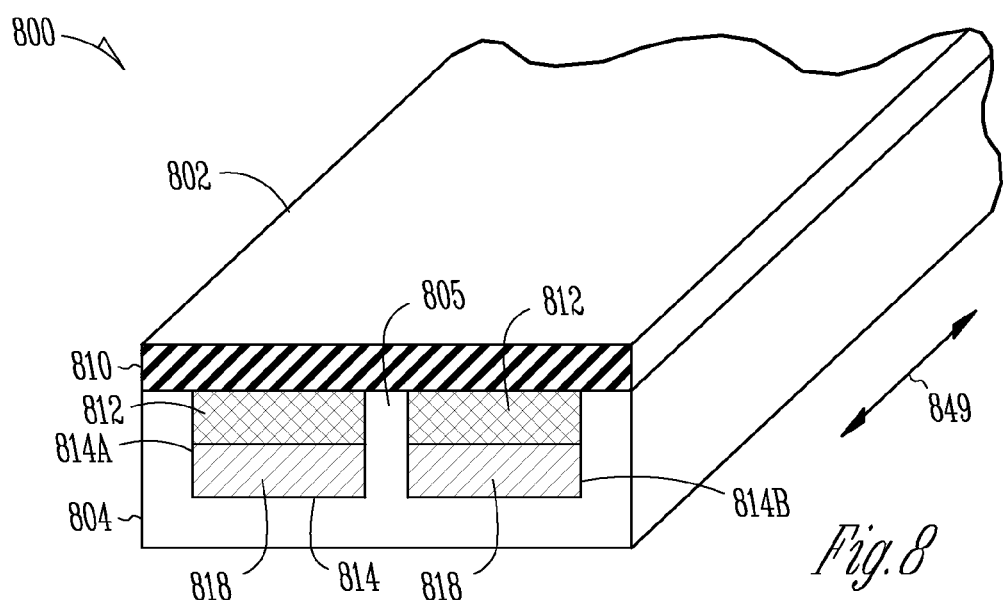
FIG. 8 illustrates a perspective view of a cross-section of a fuel cell system of the invention.
Figure 9:
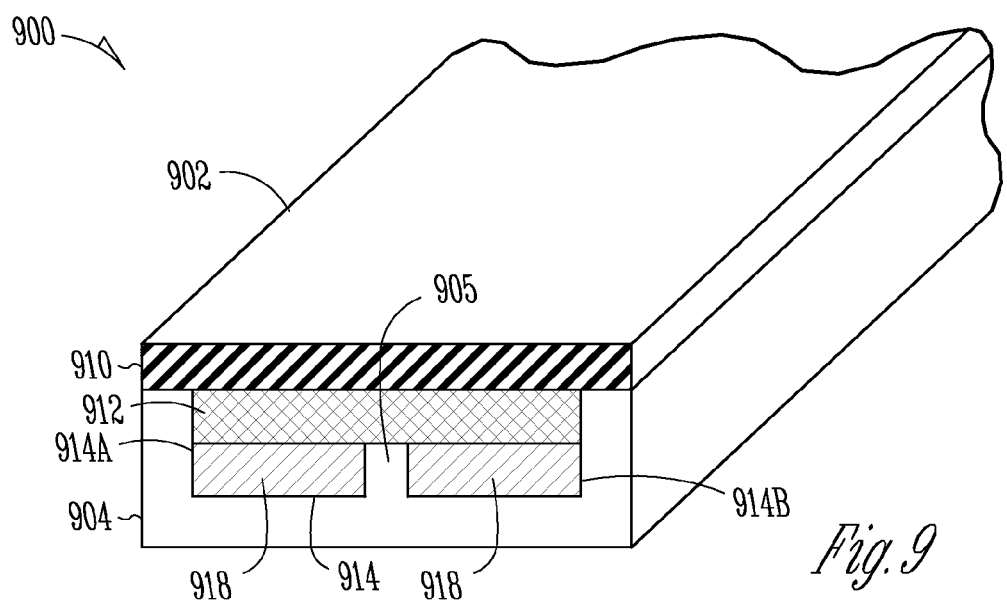
FIG. 9 illustrates a perspective view of a cross-section of a fuel cell system of the invention.

While system 800 in FIG. 8 illustrates divider 805 partitioning and extending between anodes 812 and contacting membrane 810, in some embodiments some or all of the dividers of a shell assembly may not contact the fuel cell membrane and may only extend through the anode chamber from the lower surface of a shell assembly to an anode surface on the fuel cell. FIG. 9 illustrates such an embodiment in the form of fuel cell system 900, which includes fuel cell 902 and anode shell assembly 904. Fuel cell 902 includes one or more cathode layers (not illustrated), a membrane 910, and an anode layer 912. Shell assembly 904 is secured to the anode side of fuel cell 902 and includes a divider 905 that extends through anode chamber 914, thereby dividing anode chamber 914 into flow fields 914a and 914b. A compressible filler 918 is positioned within the anode chamber 914 and is configured similar to the compressible fillers of the previously described embodiments (i.e., configured to expand and contract in response to changes in fuel cell pressure within the anode cavity and/or in response to an active controller that inflates or deflates the compressible filler). One difference between fuel cell system 900 and fuel cell system 800 illustrated in FIG. 8 is that divider 905 of fuel cell system 900 abuts the surface of anode 912 instead of extending through the fuel cell anode layer and abutting the membrane. If anode layer 912 includes a network of interconnected pores, fuel may propagate from flow field 914*a* to 914*b* by diffusing through anode layer 912 and passing over the top edge of divider 905.

The above description is intended to be illustrative, and not restrictive. Other embodiments can be used, such as by one of ordinary skill in the art upon reviewing the above description. For example, elements of one described embodiment may be used in conjunction with elements from other described embodiments. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A fuel cell system comprising:
   a fuel cell that includes a cathode, a membrane, and an anode;
   a shell assembly disposed over the anode and at least partially defining an anode chamber, wherein the anode at least partially defines the anode chamber;
   at least one compressible filler occupying a first volume within the anode chamber, wherein the compressible filler is configured to deform to occupy a second volume when a fuel pressure increases within the anode chamber, wherein the first volume is larger than the second volume, and wherein the compressible filler is configured to expand in volume in response to a decrease in the fuel pressure within the anode chamber, and wherein the compressible filler includes a first major surface and the first major surface contacts the anode of the fuel cell when the compressible filler is occupying the first volume; and
   at least one fuel channel in fluid communication with the anode chamber and a hydrogen storage reservoir, wherein the hydrogen storage reservoir is located exterior of the anode chamber, and wherein the fuel channel extends through the shell assembly and terminates at the first major surface of the compressible filler.

2. The fuel cell system of claim 1, wherein the compressible filler is configured to occupy the entire anode chamber when the fuel pressure within the anode chamber decreases below a predetermined threshold.

3. The fuel cell system of claim 1, wherein the shell assembly is a fuel manifold.

4. The fuel cell system of claim 1, wherein the compressible filler includes an inflatable bladder.

5. The fuel cell system of claim 1, wherein the fuel channel extends through the compressible filler.

6. The fuel cell system of claim 3, wherein the fuel manifold includes at least one divider within the anode chamber, wherein the divider partitions the anode chamber into at least two flow fields and wherein the divider contacts the fuel cell.

7. The fuel cell system of claim 1, wherein the compressible filler is made of a non-porous material, a porous material with a closed porosity, or combination thereof.

8. The fuel cell system of claim 1, wherein the shell assembly is configured to deform when the fuel pressure within the anode chamber exceeds a predetermined threshold.

9. The fuel cell system of claim 1, wherein the compressible filler is configured to compress a fuel within the anode chamber to maintain the fuel pressure at a predetermined level.

10. The fuel cell system of claim 1, wherein the anode chamber is partitioned into a plurality of compressible regions.

11. The fuel cell system of claim 10, wherein the system includes a plurality of fuel channels and each of the compressible regions is in fluid communication with at least one of the fuel channels.

12. The fuel cell system of claim 10, wherein the system includes a plurality of compressible fillers, each of the compressible fillers occupying a volume within one of the compressible regions.

13. The fuel cell system of claim 1, wherein the fuel cell is one of a plurality of unit fuel cells arranged within a coplanar array.

14. The fuel cell system of claim 1, wherein the first major surface is hydrophobic.

15. The fuel cell system of claim 1, wherein the first major surface is hydrophilic.

16. The fuel cell system of claim 15, wherein at least some portions of the first major surface are secured to the anode of the fuel cell.

17. The fuel cell system of claim 16, wherein the compressible filler includes a current collector.

18. A method of generating electricity, the method comprising:
   providing a fuel cell system including
      a fuel cell that includes a cathode, a membrane, and an anode side,
      a shell assembly disposed over the anode and at least partially defining an anode chamber, wherein the anode at least partially defines the anode chamber, at least one compressible filler occupying a first volume within the anode chamber, wherein the compressible filler is configured to deform to occupy a second volume when a fuel pressure increases within the anode chamber, wherein the first volume is larger than the second volume, and wherein the compressible filler is configured to expand in volume in response to a decrease in the fuel pressure within the anode chamber, and wherein the compressible filler includes a first major surface and the first major surface contacts the anode of the fuel cell when the compressible filler is occupying the first volume, and
      at least one fuel channel in fluid communication with the anode chamber and a hydrogen storage reservoir, wherein the hydrogen storage reservoir is located exterior of the anode chamber, and wherein the fuel channel extends through the shell assembly and terminates at the first major surface of the compressible filler;
   directing a fuel through the fuel channel and into the anode chamber;

increasing the fuel pressure within the anode chamber until the compressible filler is deformed to occupy the second volume within the anode chamber; and contacting the anode with the fuel to generate electricity.

19. The method of claim 18, further including allowing the fuel pressure within the anode chamber to fall below a predetermined threshold thereby allowing the compressible filler to expand and occupy the entire anode chamber.

20. The method of claim 18, wherein the fuel channel extends through the compressible filler.

* * * * *